United States Patent [19]

Dezelan

[11] 4,195,479
[45] Apr. 1, 1980

[54] TORQUE CONTROL OF HYDRAULIC MOTORS

[75] Inventor: Joseph E. Dezelan, Western Springs, Ill.

[73] Assignee: Caterpillar Tractor Co., Peoria, Ill.

[21] Appl. No.: 18,954

[22] Filed: Feb. 8, 1979

[51] Int. Cl.² .................... F16H 39/46; F16H 39/10
[52] U.S. Cl. ............................ 60/420; 60/427; 60/445; 60/451; 60/484
[58] Field of Search ............... 60/420, 422, 427, 445, 60/448, 451–452, 459, 484–490, 494

[56] References Cited

U.S. PATENT DOCUMENTS 3,984,978  10/1976  Alderson ........................... 60/422

Primary Examiner—Edgar W. Geoghegan
Attorney, Agent, or Firm—Wegner, Stellman, McCord, Wiles & Wood

[57] ABSTRACT

A vehicle drive system including a rotary output, variable displacement, hydraulic motor (22) adapted to drive a wheel or the like, a pump (10) for providing hydraulic fluid under pressure to the motor, a pressure control valve (30) connected to the motor for regulating the displacement thereof to achieve a desired system pressure and having a pressure responsive surface (34) receiving a signal representative of system pressure and a biasing spring (36) acting in opposition thereto. The invention contemplates the improvement wherein a variable, settable, pressure reducing device (60,106) is connected to the pump and to the pressure control valve to apply hydraulic fluid under reduced pressure to the pressure control valve in bucking relation to the system pressure signal.

8 Claims, 2 Drawing Figures

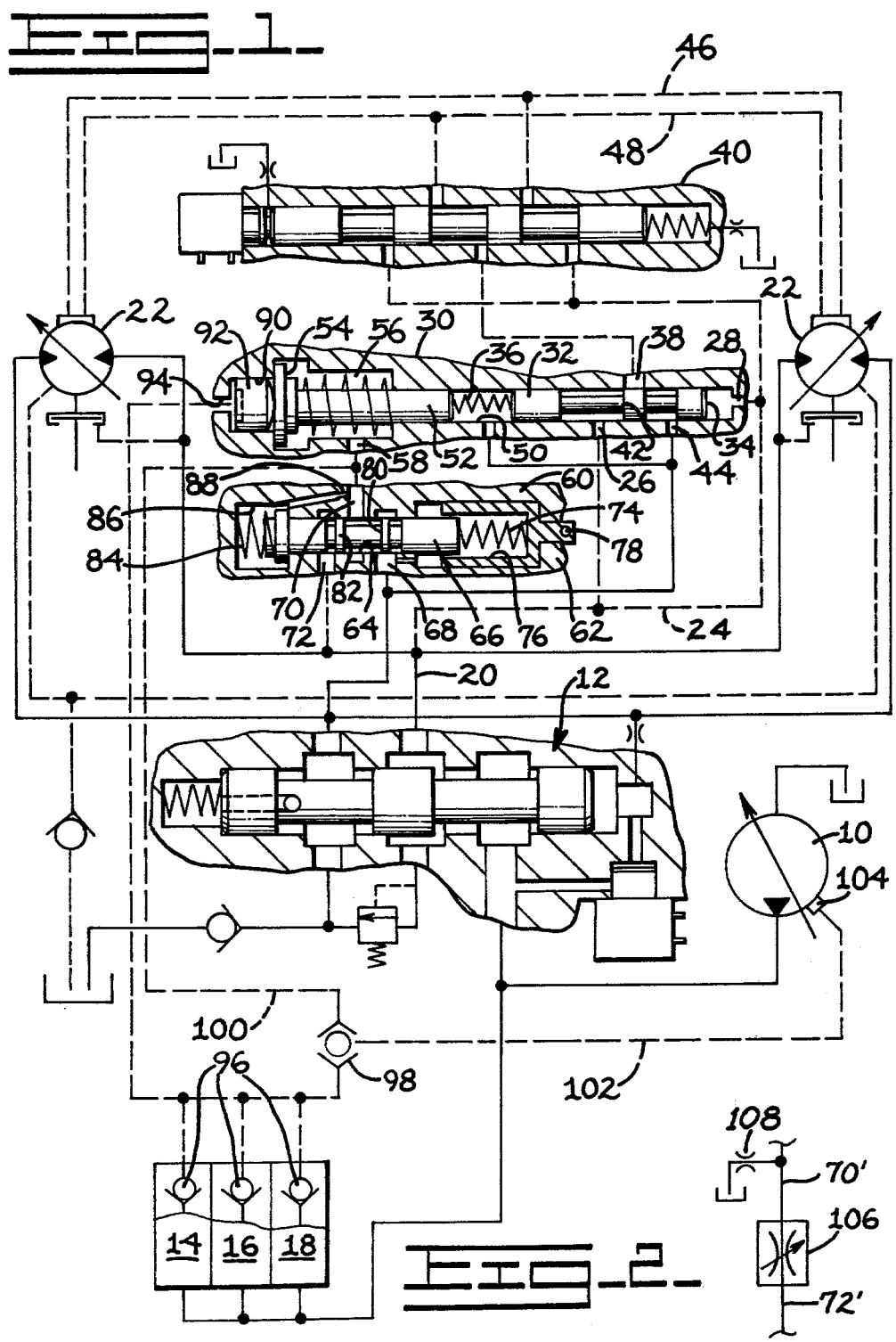

TORQUE CONTROL OF HYDRAULIC MOTORS

DESCRIPTION

TECHNICAL FIELD

This invention relates to hydraulic systems including variable displacement, rotary output, hydraulic motors and the provision of a means for torque control therein.

BACKGROUND ART

Prior art of possible relevance includes U.S. Letters Pat No. 3,984,978 issued Oct. 12, 1976 to Alderson.

Many hydraulic systems in use today utilize variable displacement, rotary output, hydraulic motors and require control of the torque output of the motor. For example, in the above Alderson patent, there is described an auxiliary drive system for the front wheels of a motor grader wherein the front wheels are driven by variable displacement, rotary output, hydraulic motors. While such a system is operative for its intended purpose, it is not without certain disadvantages. For example, in the specific application disclosed by Alderson, if one of the hydraulically driven wheels loses traction and begins to spin, the pressure control system will automatically operate to destroke the motor, that is reduce its displacement. For a given pump output, this results in the motor increasing its speed and driving the wheel at an ever increasing rate of speed with progressively decreasing torque. The speed build-up will continue until an overspeed condition exists resulting in injury to the motor or until such time as the torque level becomes so low that the wheel again grips the underlying terrain. In the latter case, vehicle handling qualities are considerably reduced due to the lack of traction and the spinning of the wheel.

DISCLOSURE OF THE INVENTION

In one aspect of the present invention, there is provided a hydraulic motor control system including a rotary output, variable displacement hydraulic motor. A pump is utilized or providing hydraulic fluid under pressure to the motor and a pressure control valve is connected to the motor for regulating the displacement thereof to achieve a desired system pressure. The pressure control valve includes a pressure responsive surface receiving a signal representative of system pressure and a biasing means acting in opposition thereto. The invention specifically contemplates the improvement wherein the biasing means includes a variable, settable, pressure reducing means connected to the pump and to the pressure control valve to apply hydraulic fluid under reduced pressure to the pressure control valve in bucking relation to the system pressure signal.

By varying the magnitude of the reduced pressure hydraulic fluid signal applied to the pressure control valve, the system pressure can be suitably selected and set at a level corresponding to the maximum torque output desired of the motor.

BRIEF DESCRIPTION OF THE DRAWINGS

FIG. 1 is a schematic of one embodiment of a hydraulic motor control system made according to the invention;

FIG. 2 is a partial schematic of a modified embodiment.

BEST MODE FOR CARRYING OUT THE INVENTION

An exemplary embodiment of the invention is illustrated in the drawings and will be described hereinafter as being utilized in the environment of a motor grader. However, those skilled in the art will readily appreciate that the same may be used with efficacy in other environments wherever it is desired principally to set a maximum torque level for the output of a variable displacement, rotary output hydraulic motor.

The system includes a pressure compensated hydraulic pump 10 for providing hydraulic fluid under pressure to a flow control valve, generally designated 12, and to a plurality of hydraulic implement circuits each including a hydraulic motor. Three such circuits are shown schematically and are desiganted 14, 16 and 18.

The flow control valve 12, for purposes of the present invention, may be regarded as conventional and when open as shown, conveys fluid from the pump 10 to a line 20 connected to each of two variable displacement, rotary output, bidirectional hydraulic motors 22. In the usual case, in a motor grader environment, one of the motors 22 would drive the left front wheel while the other would drive the right front wheel. The implement circuits 14, 16 and 18 and their associated hydraulic motors would be utilized in, for example, the swing circle for the mold board, the circuit for elevating or lowering the mold board, etc.

A pilot line 24 is connected to the high pressure line 20 to direct hydraulic fluid under pressure to ports 26 and 28 of a pressure control valve 30. The pressure control valve 30 includes a spool 32 having a pressure responsive surface 34 on one end thereof and in fluid communication with the port 28. A compression spring 36 abuts the opposite end of the spool 32 to urge, in bucking relation to the pressure responsive surface 34, the spool 32 to the right as viewed in the figure.

The pressure control valve 30 further includes a port 38 which is connected to a conventional direction control valve 40 which may be utilized to control the direction of rotation of the output shafts of the motors 22 in the usual fashion.

The spool 32 includes a land 42 for controlling fluid communication through the pressure control valve 30, that is, allowing fluid communication between the port 38 and the port 26, or between the port 38 and a port 44 connected to the hydraulic reservoir for the system.

The pilot line 24 also extends to the direction control valve 40 in the manner shown and the latter is in fluid communication with two lines 46 and 48, each extending to the swashplate control of each of the motors 22.

The swashplate controls for the motors 22 are conventional and form no part of the present invention. Similarly, the operation of the direction control valve 40 is conventional. For the purposes of the present invention, it is sufficient to appreciate that for the direction of rotation the output shafts of the motors 22 would assume for the illustrated position of the direction control valve 40, the higher the pressure in the line 46 relative to the line 48, the greater the displacement of the motors 22. As the relative difference in pressure is decreased, the swashplates of the motors 22 will respond to progressively minimize the displacement and when the pressures are the same the swashplates will assume a neutral condition. Finally, it will be appreciated that for a given rotational output speed of the motors 22, as displacement increases, the flow of hydraulic fluid per unit of time also increases and this of course tends to decrease the system pressure once the maximum flow output of the pump is reached.

To the extent thus far described, the pressure control valve 30 operates to alter the displacement of the motors 22 to maintain a given desired pressure level thereat. Under steady state conditions, the land 42 on the spool 32 will generally be in the position illustrated in the drawing, modulating fluid flow between the port 38 and the ports 26 and 44. When system pressure begins to decrease, the total force applied to the pressure responsive surface 34 will decrease so that the spring 36 will tend to shift the spool 32 to the right as viewed in the drawing. As a consequence, pressure fluid from the line 24 will be directed via the port 26 to the port 38 and through the direction control valve 40 to increase the pressure in the line 48 relative to the pressure in the line 46 and thereby destroke the motors 22, that is, reduce their displacement, thereby increasing system pressure until a steady state condition is again achieved. The desired pressure level representative of steady state operation is determined by the spring constant of the biasing spring 36 and the distance the land 42 must travel from its rightmost position to that illustrated in the drawing. In general, this pressure level would be the minimum torque level ever desired to be present on the output of the motors 22.

Of course, in many instances, a higher torque level output will be desired. And this, in turn, will require that system pressure be elevated to some value greater than that associated with the minimum desired torque level. To this end, a bore 50 of the pressure control valve 30 receiving the spool 32 also receives the reduced end 52 of a piston 54. The head end of the piston 54 is enlarged and is received in a chamber 56 coaxial with the bore 50. Both sides of the head end of the piston 54 are subjected to the pressure of any hydraulic fluid within the chamber 56 but by reason of the fact that the reduced end 52 extends out of the chamber 56 into the bore 50 which is connected to the system reservoir via the valve 12, the application of fluid under pressure to the interior of the chamber 56 will impart a shifting force to the piston 54 tending to move the same to the right within the bore 50.

The reduced end 52 of the piston 54 bears against the end of the spring 36 opposite from the spool 32 and such rightward movement will, of course, tend to compress the spring 36 further and thereby increase the presssure value required to be applied against the pressure responsive surface 34 of the spool 32 necessary to shift the same to the left such that the land 42 can move to the position illustrated in the drawings at which steady state conditions exist. As a result, some higher pressure must be present at the port 28 to shift the spool 32 to the illustrated position when the piston 54 has moved some distance to the right than when the piston 54 is in the position illustrated.

This, in turn, means that existing system pressure, at any level will be applied to the line 48 via the ports 26 and 38 of the pressure control valve and the direction control valve 40 until system pressure increases above that associated with the minimum torque level to that which is required to shift the spool 32 to the position illustrated. And this in turn narrows the pressure differential between the lines 46 and 48 thereby causing the motors 22 to destroke, i.e. move towards minimum displacement which, of course, has the effect of increasing system pressure to the point necessary to achieve steady state conditions. The increased pressure in the system will, of course, increase the maximum torque output available at the motors 22.

Application of fluid under pressure to the interior of the chamber 56 is provided at a port 58 connected to the output of a pressure reducing valve 60. The valve 60 includes a body 62 having a bore 64 which slidably receives a spool 66. The body includes axially spaced ports 68, 70 and 72 opening to the bore 64 with the port 70 serving as a reduced pressure hydraulic signal emitting port connected to the port 58 for the chamber 56. The port 68 is connected to the system reservoir while the port 72 is connected to the high pressure line 20.

One end of the spool 66 is abutted by a spring 74 which is received within an interior bore 76 of a plunger 78. The plunger 78 is mounted for reciprocation within the body 62 and those skilled in the art will appreciate that by varying the position of the plunger 78, through any desirable control linkage, the degree of pressure on the spring 74 can be selectively altered to adjust the biasing force applied thereby to the spool 66. Typically, conventional detent or restraining means would be associated with any linkage used for controlling the position of the plunger 78.

The spool 66 includes a first land 80 which may be shifted upon spool movement to block fluid communication between the ports 68 and 70. An additional land 82 is operative to control fluid communication between the ports 70 and 72.

In bucking relation to the spring 74, and within the body 62, is a spring 84 which acts against the opposite end of the spool 66. More specifically, the spring 84 acts against the spool 66 within a chamber 86 formed in the body 62. The chamber 86 is connected by a flow passage including a restricted orifice 88 to the port 70. As a consequence, fluid under pressure in the port 70 will be applied to the left-hand end of the spool 66 in concert with the biasing force applied by the spring 84. The orifice 88 serves to restrict fluid flow through the passage between the port 70 and the chamber 86 to dampen oscillating movement of the spool 66 in response to changes in pressurization within the chamber 86.

The valve 60 acts, in effect, as a pressure reducing valve, reducing the pressure at the port 70 from that at the port 72 to some lesser pressure, depending upon the position of the plunger 78, and applies the reduced pressure to the piston 54. Because of the provision of feedback through the restricted orifice 88 of pressure in the port 70, the pressure in the port 70 will be at a substantially constant value dependent upon the setting of the plunger 78 irrespective of the pressure in the high pressure line 20, unless, of course, the pressure in the line 20 drops below that commanded by the setting of the plunger 78.

The body housing the pressure control valve 30 includes a bore 90 to the left of the chamber 56 which slidably receives a piston 92 which in turn is in abutment with head of the piston 54. Thus, rightward movement of the piston 92 within its bore 90 also may serve to increase the compression on the spring 36 ultimately causing an elevation in system pressure.

Fluid under pressure may be directed against the piston 92 to cause such movement via a port 94 connected to check valves 96 connected to the high pressure sides of the implement circuits 14, 16 and 18 in a conventional fashion. Thus, the port 94 will be supplied with a hydraulic pressure signal indicative of the highest loading pressure on any of the circuits 14, 16 and 18.

The check valves 96 are also connectd to a resolver 98. The resolver 98 receives a second input on a line 100 connected to the port 70 of the pressure reducing valve 60. The output of the resolver 98 is connected via a line 102 to the pressure control mechanism 104 of the pressure compensated pump 10. As a consequence, the pump control 104 receives a pressure signal corresponding to the highest pressure of those existing at the port 70 and the loading in the circuits 14, 16 and 18. In the usual case, the highest of such pressures will be that at the port 70. Should a higher pressure come into existence as a result of heavy loading in any of the implement circuits 14, 16, 18, it will be applied to the pressure control 104 to cause the pressure compensated pump 10 to increase its output pressure in a conventional fashion.

FIG. 2 illustrates, schematically, an alternate embodiment of the invention and specifically a variable orifice 106 is connectd to a line 72' which and is connected to the line 20 just as the port 72 of the pressure reducing valve 60 in FIG. 1. The output of the orifice 106 is designated 70' and is connected to the port 58 of the pressure control valve 30 as well as to the resolver 98 just as the output or signal port 70 of the pressure reducing valve 60 in FIG. 1. The output 70' is also connected to the system reservoir through an orifice 108.

Industrial Applicability

In use, in the environment of an auxiliary front wheel drive for a motor grader, with the motors 22 driving respective ones of the front wheels, operation will generally be as follows. The plunger 78 of the pressure reducing valve 60 may be set initially at a position whereat little or no fluid under pressure is directed to the chamber 56 of the pressure control valve 30. As a consequence, fluid flow to the motors 22 and the pressure thereof, will be governed principally by the bias of the spring 36 applied to the spool 32 which, it will be recalled, will typically be such that the system pressure value will correspond to a minimum torque output of the motors 22. In the event more torque is desired, the plunger 78 is advanced to the left as viewed in FIG. 1 and fluid communication between the port 72 and the port 70 of the pressure control valve 60 will be established. The spring 84 and the restricted feedback path 88 will prevent continued movement of the spool 66 and steady state conditions will soon be reached at which time fluid at some reduced pressure will be applied to the chamber 56 to act against the piston 54 and compress the spring 36. This in turn will initially urge the spool 32 of the pressure control valve to the right as viewed in FIG. 1 causing the motors 22 to destroke with the consequence that system pressure will begin to rise. This rising pressure is applied to the pressure responsive surface 34 of the spool 32 and at some point in time, steady state conditions will be reached with the land 42 modulating fluid flow between the port 38 and the ports 26 and 44. This increased system pressure will provide for greater torque output of the motors 22.

If, at any time, the system pressure as set by use of the pressure reducing valve 60 is insufficient to operate any of the implement circuits 14, 16 and 18, the same will provide an elevating load signal to the port 94 to urge the piston 92 to the right and, via the intermediate piston 54, compress the spring 36 to a greater degree. Again, system pressure will elevate until such time as it has reached a value whereat the load signal becomes constant.

It will also be observed that the reduced pressure signal from the port 70 or the load signal from the implement circuits 14, 16 and 18 are applied to the pump control 104 of the pressure compensated pump 10. Thus, should a higher pump pressure be required as indicated by a high load in one of the implement circuits 14, 16 or 18 or a high torque command issued by leftward movement of the plunger 78, the increased pressure signal would be applied on the line 102 to the pump control 104 to upstage the same and provide a higher output pressure. Conversely, if the pump 10 is operating at a high output pressure and a lesser one will suffice to provide the desired torque at the motors 22, movement of the plunger 78 by the operator to the right as viewed in FIG. 1 will result in a reduced pressure at the pump control 104 so that it may lower its output pressure accordingly.

With the embodiment illustrated in FIG. 2, operation is essentially the same, the pressure reducing feature provided by the pressure reducing valve 60 being accomplished through suitable adjustment of the variable orifice 106. A large orifice opening would provide a relatively high output pressure on the line 70' and would correspond to a leftward shift of the plunger 78 of the pressure reducing valve 60 and ultimately provide a greater torque. Conversely, a small orifice would cause a great reduction of pressure similar to that which would be caused by rightward movement of the plunger 78 with a corresponding reduction in torque at the motors 22.

While the system and its operation has been described in connection with a pressure compensated pump, it should be understood that a pressure upstage pump could be used in lieu thereof. Such pumps typically operate at either a low pressure stage or a high pressure stage. With such an upstage pump, the pressure reducing valve 60 may be set to select the pressure at which the motors 22 begin to shift toward minimum displacement irrespective of whether the pump is operating in the high pressure stage or the low pressure stage as will be apparent to those skilled in the art. In such a case, the pressure reducing valve 60 does not set the absolute pressure applied to the motors 22, this being determined by the pressure of the output of the pump which will be dependent upon whether the pump is operating in the high or low pressure stage. Rather, the pressure reducing valve 60 sets a pressure that will cause the motors 22 to shift towards minimum displacement if the system pressure falls below the value set by the valve 60.

Lastly, it should be noted that the pressure compensating spool 32 will not always assume a modulating position under steady state conditions as shown in FIG. 1. If the system pressure is higher than the combined pressure of that provided by the spring 36 and that acting on the piston 54 in a rightward direction, the spool 32 will shift to the left to connect the control systems of the motors 22 to the system reservoir via the valve 12. Consequently, the motors 22 will be at full displacement as is desired in such a situation.

From the foregoing, it will be appreciated that through use of the invention, accurate control of torque of a hydraulic motor can be accurately controlled in systems using pumps other than flow and pressure compensated pumps. It will also be appreciated that when a pressure compensated pump is utilized, the same can be upstaged according to load demands, particularly those of implement circuits which are used only intermittently in comparison to the typical mode of operation of the rotary output motors.

I claim:

1. In a vehicle drive system including a rotary output, variable displacement hydraulic motor (22) adapted to drive a wheel or the like, a pump (10) for providing hydraulic fluid under pressure to the motor, a pressure control valve (30) connected to the motor for regulating the displacement thereof to achieve a desired system pressure and having a pressure responsive surface (34) receiving a signal representative of system pressure and a biasing means (36) acting in opposition thereto, the improvement wherein said biasing means includes a variable settable pressure reducing means (54,60,106) connected to said pump and to said pressure control valve to apply hydraulic fluid under reduced pressure to said pressure control valve in bucking relation to said signal.

2. The vehicle drive system of claim 1 wherein said biasing means further includes a spring (36).

3. The vehicle drive system of claim 2 wherein said pressure reducing means comprises a pressure reducing valve 60 having feedback means (88).

4. The vehicle drive system of claim 2 wherein said pressure reducing means comprises a variable flow restrictor (106).

5. A vehicle drive and work performing system including the vehicle drive system of claim 2 and further including at least one additional hydraulic motor (14,16,18) connectable to said pump and adapted to perform work; means (96) associated with said additional hydraulic motor for providing a hydraulic loading signal representative of the loading thereon, and means (92,94) for applying said loading signal to said pressure control valve in bucking relation to said pressure responsive surface.

6. In a hydraulic motor control system the combination of:
   a variable displacement hydraulic motor (22);
   a pressure compensated pump (10) for providing hydraulic fluid under pressure to said motor, said pump having a control (104);
   a control valve (30) for controlling the level of a pressure signal to said motor to thereby control the displacement thereof, said control valve having a pressure responsive surface (34) in fluid communication with said pump and biasing means (36) acting in opposition to said surface;
   a variable pressure reducing valve (54,60) connected to said pump for applying a selected, reduced pressure hydraulic signal to said control valve in concert with said biasing means; and
   means (98, 100) for applying said reduced pressure hydraulic signal to said pump control.

7. The hydraulic motor control system of claim 6 wherein said biasing means comprises a compression spring (36) and further including piston means (54,92) compressing said spring, said pressure reducing valve applying said reduced pressure hydraulic signal to said piston means.

8. The hydraulic motor control system of claim 7 further including an additional hydraulic motor (14,16,18) connectable to said pump; means (86) for providing a hydraulic loading signal representing the loading on said additional hydraulic motor; means (94) for applying said loading signal to said piston means; and means (98) for applying the higher of said reduced pressure hydraulic signal and said loading signal to said pump control.

* * * * *